(12) United States Patent
Spets et al.

(10) Patent No.: US 6,643,276 B1
(45) Date of Patent: Nov. 4, 2003

(54) DATA GATEWAY AND METHOD FOR CONVEYING DATA TO A BASE SITE IN A COMMUNICATION SYSTEM

(75) Inventors: Timothy J. Spets, Algonquin, IL (US); Tomas Capurka, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/201,002

(22) Filed: Nov. 30, 1998

(51) Int. Cl.[7] .................................................. H04Q 7/00
(52) U.S. Cl. ........................ 370/328; 370/349; 370/401; 370/458; 370/468
(58) Field of Search .................................. 370/328, 349, 370/401, 353, 204, 354, 442, 355, 352, 347, 437, 395.1, 468, 392, 337, 338, 465, 473; 375/261

(56) References Cited

U.S. PATENT DOCUMENTS

| | | | |
|---|---|---|---|
| 5,533,004 A | * 7/1996 | Jasper et al. | 370/204 |
| 5,588,009 A | 12/1996 | Will | |
| 5,872,777 A | * 2/1999 | Brailean et al. | 370/349 |
| 5,910,946 A | * 6/1999 | Csapo | 370/328 |
| 6,075,783 A | * 6/2000 | Voit | 370/352 |
| 6,212,240 B1 | * 4/2001 | Scheibel, Jr. et al. | 375/261 |

FOREIGN PATENT DOCUMENTS

| | | |
|---|---|---|
| EP | 662778 A2 | 12/1994 |
| EP | 0903905 A2 | 3/1999 |
| GB | 2292290 A | 2/1996 |
| WO | WO 95/20281 | 7/1995 |
| WO | WO 97/16890 | 5/1997 |

* cited by examiner

*Primary Examiner*—Chi Pham
*Assistant Examiner*—Alexander O. Boakye
(74) *Attorney, Agent, or Firm*—Jeffrey K. Jacobs

(57) ABSTRACT

To address the need for conveying data to a base site (110) and communication unit (104) without substantially introducing congestion or delay to the network used, the present invention provides two methods and a data gateway apparatus. The data gateway (116) upon receiving a data packet addressed to a communication unit (104), divides the data packet into data blocks and generates transmission data packets which can be transmitted from a base site (110) to the communication unit (104) in individual time slots. The transmission data packets, being smaller than the data packet, do not introduce substantial delay to an infrastructure network (114) and are conveyed over time to prevent congestion.

6 Claims, 3 Drawing Sheets

DATA GATEWAY AND METHOD FOR CONVEYING DATA TO A BASE SITE IN A COMMUNICATION SYSTEM

FIELD OF THE INVENTION

The present invention relates generally to communication systems and, in particular, to conveying data from a data gateway to a base site in a communication system.

BACKGROUND OF THE INVENTION

Communication systems that provide strictly voice services are well known in the art. When data services, such as email and internet browsing, are added to such systems, a number of problems must be solved. The network that carries the voice traffic between components of the communication system infrastructure and the base sites must now carry data traffic as well, or the expense of a separate network incurred. Voice traffic is very sensitive to delay, so the data traffic must be introduced to the network without congesting the network or substantially increasing network delay.

To connect the communication system to an outside network, such as the Internet, a gateway is used to interface the two networks. Data for a communication unit is received by the gateway and conveyed to the appropriate base site via the infrastructure network.

The base site then transmits the data to the communication unit. As the data is sent from the gateway to the base site and finally to the communication unit, the voice traffic on the infrastructure network must not be substantially affected.

Therefore, a need exists for an apparatus and method for conveying data to a base site and communication unit, without substantially introducing congestion or delay to the infrastructure network.

DESCRIPTION OF A PREFERRED EMBODIMENT

The present invention addresses the need for conveying data to a base site and communication unit without substantially introducing congestion or delay to the infrastructure network. The data gateway, upon receiving a data packet for a communication unit, divides the data packet into data blocks. The data gateway generates transmission data packets which can be transmitted from a base site to the communication unit in individual time slots. The transmission data packets, being smaller than the data packet, do not introduce substantial delay to the infrastructure network and can be conveyed over a period of time to prevent network congestion.

The present invention encompasses a method for conveying data from a data gateway to a base site, the data gateway and the base site being components in a communication system infrastructure. The data gateway receives a data packet from a data source outside the communication system infrastructure, such as the Internet, and divides the data packet into data blocks. The data gateway determines a quantity of the data blocks that can be transmitted in a time slot by the base site and generates a transmission data packet comprising the quantity of data blocks determined. The data gateway also determines a sequence identifier for the transmission data packet. Finally, the data gateway conveys the transmission data packet and the sequence identifier to the base site.

After the data gateway conveys the transmission data packet to the base site, the data gateway receives an indication that the transmission data packet was not received by a communication unit.

The data gateway generates a retransmission data packet comprising at least a portion of the transmission data packet. The data gateway also determines a second sequence identifier for the retransmission data packet. The data gateway, then, conveys the retransmission data packet and the second sequence identifier to the base site.

The present invention additionally encompasses a data gateway apparatus. The data gateway comprises a first network interface processor capable of receiving data from a first network, a second network interface processor capable of transmitting a transmission data packet and control information via a second network to a base site, and a communication processor. The communication processor divides the data into data blocks, and determines a quantity of the data blocks that can be transmitted by the base site in a time slot. The communication processor generates a transmission data packet comprising the quantity of the data blocks determined and generates control information that instructs the base site to transmit the transmission data packet in a time slot based on a sequence identifier.

The communication processor then requests the second network interface processor to transmit the transmission data packet and control information to the base site.

Figure 1:
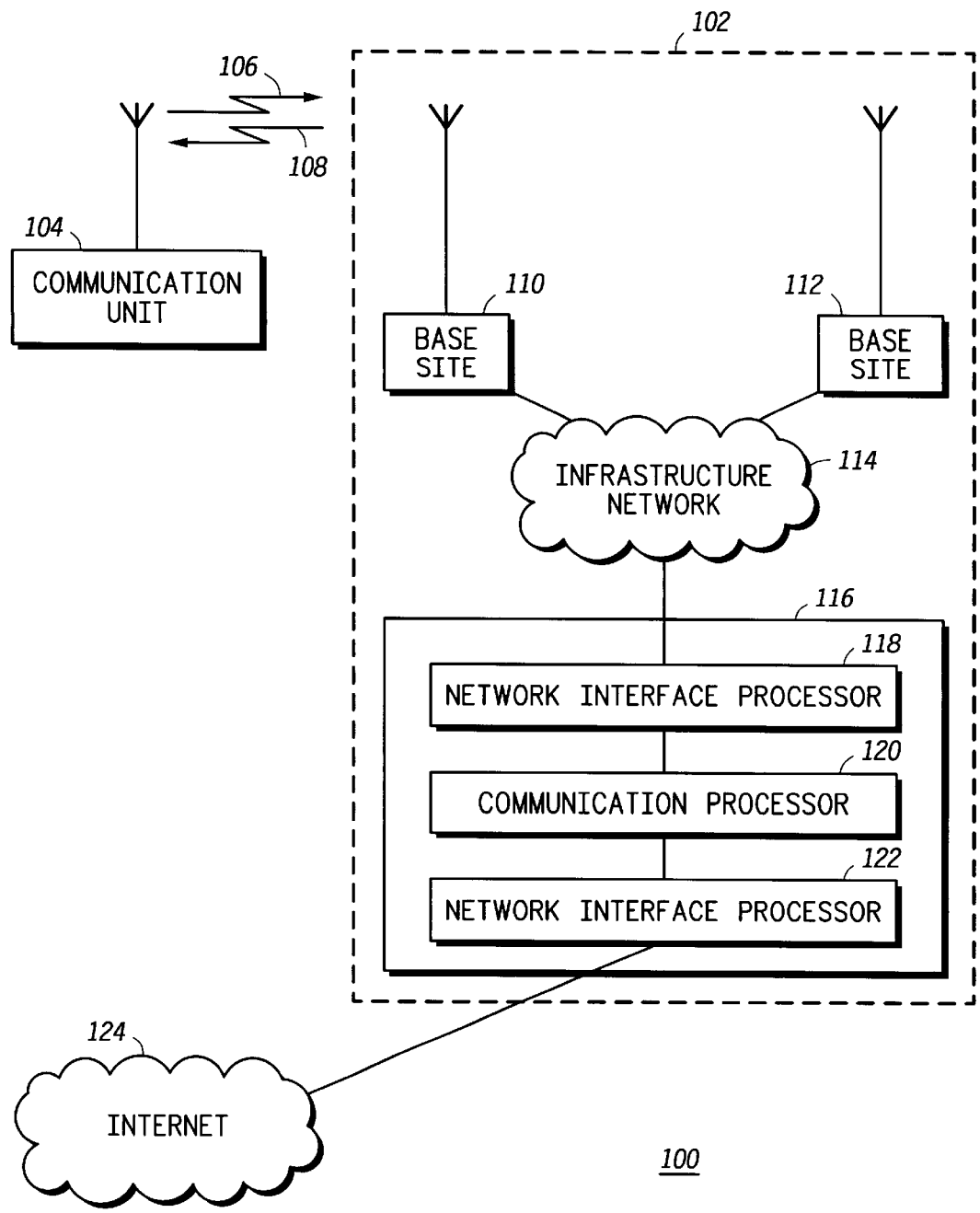
FIG. 1 is a block diagram depiction of a communication system in accordance with a preferred embodiment of the present invention.

The present invention can be more fully understood with reference to FIGS. 1–6. FIG. 1 is a block diagram depiction of a communication system 100 in accordance with a preferred embodiment of the present invention. Communication system 100 comprises a communication unit 104 and a communication system infrastructure 102 which is preferably coupled to a network that uses an internet protocol, such as the Internet 124. Communication system infrastructure 102 comprises a data gateway 116, an infrastructure network 114, and base sites 110 and 112. Although, for clarity, only two base sites are shown in communication system infrastructure 102, a communication system infrastructure may contain more base sites.

Preferably, communication system 100 comprises an "iDEN" communication system, all components of which are commercially available from "MOTOROLA", Inc. of Schaumburg, Illinois.

Accordingly, communication unit 104 is preferably an "iDEN" phone, and base sites 110 and 112 are preferably "iDEN" Enhanced Base Transceiver System (EBTS) sites. Infrastructure network 114 preferably comprises a frame relay network used to convey voice and data to and from base sites 110 and 112. Data gateway 116, comprising communication processor 120 and network interface processors 118 and 122, is preferably an "iDEN" Mobile Data Gateway (MDG). Accordingly, network interface processor 122 preferably comprises conventional circuitry operated and controlled by routinely developed software, such as the circuitry and software used in various network interface cards. Network interface processor 118 preferably comprises conventional circuitry operated and controlled by routinely developed software, such as the circuitry and software used in various frame relay network interface cards. Finally, communication processor 120 preferably comprises a known microprocessor and memory device.

Operation of communication system 100 occurs, in accordance with the present invention, substantially as follows. Network interface processor 122 of data gateway 116 receives data, preferably via the Internet 124, for communication unit 104. Communication processor 120 divides the data into one or more data blocks and determines how many data blocks can be transmitted by a target base site in a single time slot. Since the number of data blocks that can be transmitted in a time slot depends on the modulation rate used, communication processor 120 determines the modulation rate at which the data blocks will be transmitted. Preferably, the modulation rate is determined according to the particular data transfer protocol being used by the data gateway.

The communication processor 120 then generates a transmission data packet comprising the quantity of data blocks determined. The data blocks selected for the transmission data packet are selected from the data blocks formed from the received data. The communication processor 120 also generates control information comprising the transmission modulation rate and a sequence identifier. The control information instructs the target base site to transmit the transmission data packet at the transmission modulation rate determined and in a time slot based on the sequence identifier. The sequence identifier is preferably a sequence number for the transmission data packet that instructs the base site to transmit the transmission data packet at a particular place within a sequence of related data packet transmissions. The communication processor 120 then requests network interface processor 118 to transmit the transmission data packet and control information to the target base site.

The target base site is base site 110 as shown in FIG. 1. More generally, the target base site is the base site currently providing service to the target communication unit. In the preferred embodiment, network interface processor 118 transmits the transmission data packet and control information via the infrastructure network 114 to base site 110. Base site 110 then transmits the transmission data packet to communication unit 104 using a time slot of a time divisioned radio frequency channel 108.

In the case where communication unit 104 does not completely receive the transmission data packet, communication unit 104 transmits, via a time slot of a time divisioned radio frequency channel 106, an indication that the transmission data packet was not received by communication unit 104. The transmission data packet may not have been received by communication unit 104 because of external interference on radio frequency channel 106, for example, or poor signal strength due to the location of communication unit 104 in the coverage area of base site 110. Network interface processor 118 receives the indication via infrastructure network 114 and base site 110. In response to the indication, the communication processor 120 generates a retransmission data packet comprising at least a portion of the transmission data packet and generates retransmission control information that instructs the target base site to transmit the retransmission data packet in a time slot based on a retransmission sequence identifier. Finally, the communication processor 120 requests the second network interface processor 118 to transmit the retransmission data packet and retransmission control information to the target base site.

By conveying data to base site 110 and communication unit 104 in the above manner, data is conveyed via the infrastructure network 114 without substantially introducing congestion or delay to the infrastructure network. Because the transmission data packets are typically substantially smaller than the data packets received via the Internet 124, they do not introduce substantial delay to the infrastructure network. And because the individual transmission data packets can be conveyed separately over a period of time, substantial network congestion is avoided.

Figure 2:
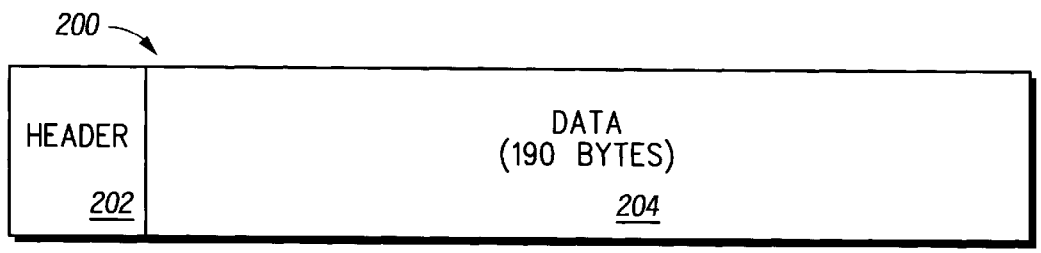
FIG. 2 is a block diagram depiction of a data packet received by a data gateway in accordance with the preferred embodiment of the present invention.

FIG. 2 is a block diagram depiction of a data packet 200 received by the data gateway in accordance with the preferred embodiment of the present invention. Preferably, data packet 200 is a typical internet protocol data packet with an internet protocol header 202 and a data portion 204 that is 190 bytes in length.

Figure 3:
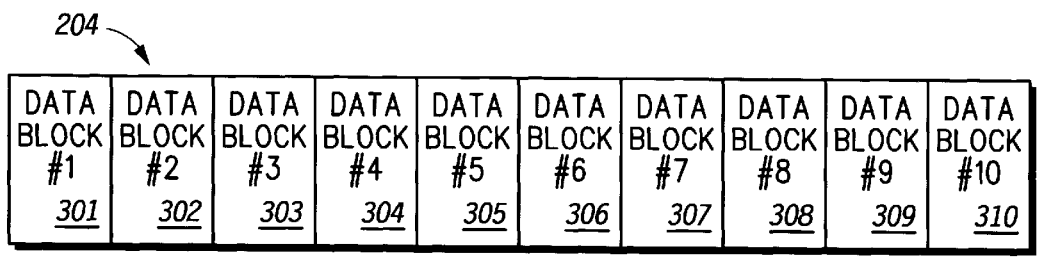
FIG. 3 is a block diagram depiction of a data portion of the data packet received by the data gateway and divided into data blocks in accordance with the preferred embodiment of the present invention.

FIG. 3 is a block diagram depiction of data portion 204 of data packet 200 received by the data gateway and divided into data blocks 301–310 in accordance with a preferred embodiment of the present invention. Data blocks 301–310 are equally sized, all being 19-byte data blocks in the preferred embodiment.

Figure 4:
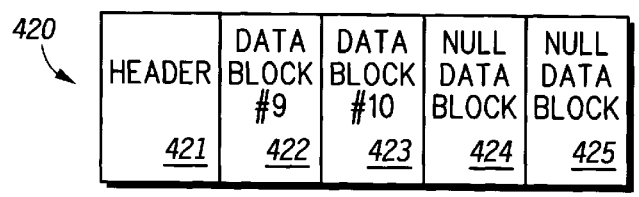
FIG. 4 is a block diagram depiction of transmission data packets generated by the data gateway in accordance with the preferred embodiment of the present invention.

FIG. 4 is a block diagram depiction of transmission data packets 400, 410, and 420 generated by the data gateway in accordance with a preferred embodiment of the present invention. FIG. 4 assumes, for the purpose of illustration, that the data gateway determined that four data blocks could be transmitted by the target base site in a single time slot. Thus, three transmission data packets are required to convey data blocks 301–310 from the data gateway to the communication unit via a base site.

Data blocks 402–405, data blocks 412–415, and data blocks 422–425 are data blocks 301–310 divided among transmission data packets 400, 410, and 420, respectively. Null data blocks 424 and 4serve as time slot place holders, in the preferred embodiment, to uniformly fill the time slot in which transmission data packet 420 is transmitted.

Transmission data packet headers 401, 411, and 421 comprise the control information generated by the data gateway. Preferably then, a modulation rate and a sequence identifier is included in each transmission data packet header. Transmission data packet headers 401, 411, and 421 all contain the same modulation rate, but different sequence identifiers. Transmission data packet headers 401, 411, and 42contain sequence identifiers that instruct the target base site to transmit transmission data packets 400, 410, and 420 sequentially with respect to each other to enable the target communication unit to reassemble the data portion 204.

Figure 5:
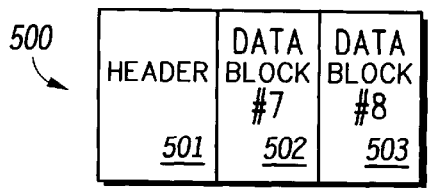
FIG. 5 is a block diagram depiction of a retransmission data packet generated by the data gateway in accordance with the preferred embodiment of the present invention.

FIG. 5 is a block diagram depiction of a retransmission data packet 500 generated by the data gateway in accordance with the preferred embodiment of the present invention. The retransmission data packet 500 is generated by the data gateway in response to an indication that the target communication unit did not receive data blocks 414 and 415. Data blocks 414 and 415 are thus being reconveyed as data blocks 502 and 503. Retransmission data packet header 501 comprises retransmission control information that instructs the target base site to transmit retransmission data packet 500 at half the modulation rate that transmission data packets 400, 410, and 420 were transmitted.

Figure 6:
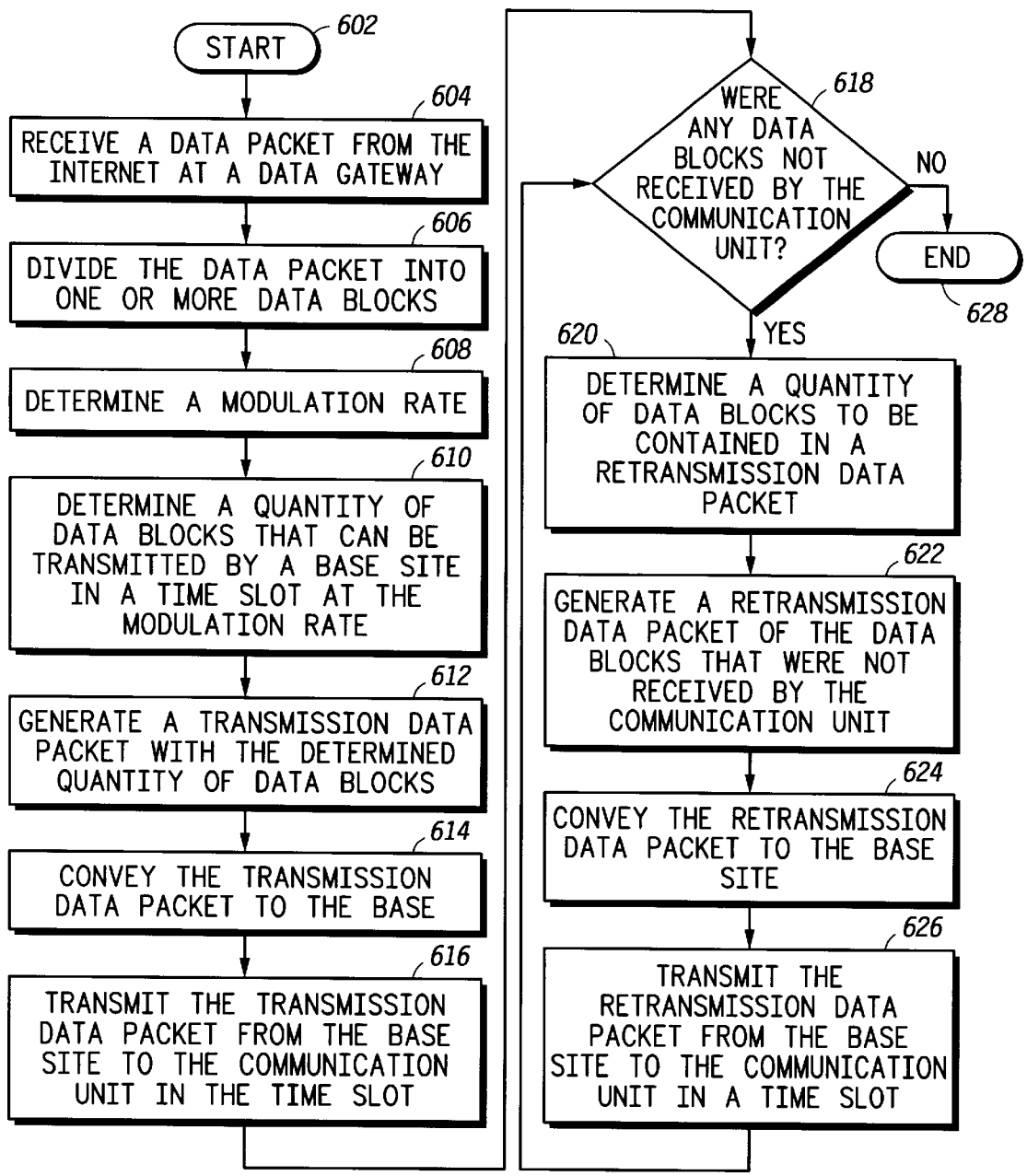
FIG. 6 is a logic flow diagram of steps executed by a communication system infrastructure in accordance with the preferred embodiment of the present invention.

FIG. 6 is a logic flow diagram 600 of steps executed by a communication system infrastructure in accordance with a preferred embodiment of the present invention. The logic flow begins (602) when the data gateway receives (604) a data packet from a network outside the communication system infrastructure. Preferably, the data packet is an internet protocol data packet from a data source outside the communication system infrastructure and connected to the Internet. The data gateway divides (606) the data packet into one or more data blocks, preferably 19 bytes in length.

To determine a quantity of the data blocks that can be transmitted in a time slot by a base site, the data gateway first determines (608) a modulation rate at which the base site can transmit. In the preferred embodiment, a modulation rate is selected from the group consisting of 64-ary quadrature amplitude modulation (QAM), 16-ary QAM, and quadrature phase shift keying (QPSK). Given the modulation rate, the size of the data blocks, and the length of a time slot, a quantity of data blocks can be determined. In the preferred embodiment, when the modulation rate is 64-ary QAM, four data blocks can be transmitted by the base site in a time slot, when the modulation rate is 16-ary QAM, two data blocks can be transmitted, and when the modulation rate is QPSK, one data block can be transmitted. Thus, the data gateway determines (610) the quantity of data blocks that can be transmitted by the base site in a time slot at the modulation rate.

The data gateway selects the quantity of data blocks determined and generates (612) a transmission data packet comprising the selected data blocks. The data gateway also determines a sequence identifier for the transmission data packet that indicates the transmission data packet's place within a sequence of related data packet transmissions. The data gateway then conveys (614) the transmission data packet and the sequence identifier to the base site.

The base site transmits (616) the transmission data packet to the target communication unit using a time slot based on the sequence identifier. Preferably, the target communication unit, upon receiving the transmission data packet, responds with an acknowledgment to the data gateway, via the base site. If (618) the acknowledgment from the target communication unit indicates that the target communication unit received the transmission data packet, the logic flow ends (628).

Otherwise, if the acknowledgment from the target communication unit indicates that the target communication unit did not receive the transmission data packet or no acknowledgment is received by the base site or the data gateway, the data gateway reconveys some or all of the data blocks. Preferably, the indication indicates which data blocks in the transmission data packet were not received by the communication unit. The data gateway determines (620) a retransmission quantity of the data blocks in the transmission data packet that were not received by the communication unit that can be retransmitted in a time slot by the base site. The data gateway generates (622) a retransmission data packet comprising at least a portion of the data blocks from the transmission data packet, and preferably, a retransmission data packet comprising the retransmission quantity of data blocks of the data blocks in the transmission data packet that were not received by the communication unit. For the retransmission data packet, the data gateway determines a second sequence identifier and then conveys (624) both the retransmission data packet and the second sequence identifier to the base site. Finally, the base site transmits (626) the retransmission data packet to the communication unit using a time slot based on the second sequence identifier.

In the preferred embodiment, the logic flow returns to decision step 618. If the communication unit received the retransmission data packet, the logic flow ends. Otherwise, steps 620, 622, 624, and 626 are repeated.

By generating transmission data packets at the data gateway, the present invention provides two substantial benefits. First, the transmission data packets when conveyed via the infrastructure network do not substantially increase the network delay, since the transmission data packets are relatively small. Also, the individual transmission data packets are conveyed over a period of time, substantially preventing added congestion. If the data gateway conveyed the data packets it received without breaking the data packets apart, the larger packet sizes would substantially increase the infrastructure network delay. Also, the whole data packet would be introduced into the network at once, adding to network congestion. Because the infrastructure network also conveys voice packets, such increased network delay or congestion would adversely affect the voice services.

Second, by generating transmission data packets at the data gateway rather than at the base sites, where the data would need to be divided into time slots anyway, a cost savings is achieved. Typically, such communication systems will have one data gateway and tens of base sites. Preparing data for time slot transmission in one box, the data gateway, is more cost effective than distributing the functionality and adding to the processing load of many boxes, the base sites. Thus, the present invention provides a cost effective method and apparatus for conveying data to a base site and communication unit without substantially introducing congestion or delay to the infrastructure network.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A data gateway comprising:

a first network interface processor adapted for receiving data from a first network;

a second network interface processor adapted for transmitting a transmission data packet and control information via a second network to a base site; and a communication processor, coupled to the first network interface processor and the second network interface processor, adapted for dividing the data into a plurality of data blocks, determining a quantity of the plurality of data blocks that can be transmitted by the base site in a time slot, generating the transmission data packet comprising the quantity of data blocks determined, the data blocks being selected from the plurality of data blocks, generating the control information that instructs the base site to transmit the transmission data packet in a time slot based on a sequence identifier, and requesting the second network interface processor to transmit the transmission data packet and control information to the base site.

2. The data gateway of claim 1, wherein the sequence identifier is a sequence number for the transmission data packet that instructs the base site to transmit the transmission data packet at a particular place within a sequence of related data packet transmissions.

3. The data gateway of claim 1, wherein the first network is a network that uses an internet protocol.

4. The data gateway of claim 1, wherein the second network is a frame relay network.

5. The data gateway of claim 1, wherein the communication processor further determines a transmission modulation rate and includes the transmission modulation rate in the control information to instruct the base site to transmit the transmission data packet in a time slot at the transmission modulation rate determined.

6. The data gateway of claim 1, wherein the second network interface processor further receives via the second network an indication that the transmission data packet was not received by a communication unit, and wherein the communication processor further generates a retransmission data packet comprising at least a portion of the transmission data packet, generates retransmission control information that instructs the base site to transmit the retransmission data packet in a time slot based on a retransmission sequence identifier, and requests the second network interface processor to transmit the retransmission data packet and retransmission control information to the base site.

* * * * *